Figure 1:
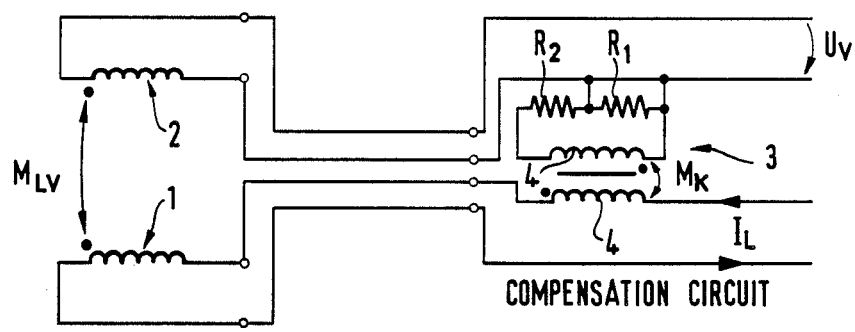

United States Patent [19]

Leinonen et al.

[11] Patent Number: 4,894,619

[45] Date of Patent: Jan. 16, 1990

[54] IMPULSE INDUCED EDDY CURRENT TYPE DETECTOR USING PLURAL MEASURING SEQUENCES IN DETECTING METAL OBJECTS

[75] Inventors: Erkki I. Leinonen, Vantaa; Kari T. J. Aittoniemi, Espoo, both of Finland

[73] Assignee: Outokumpu Oy, Helsinki, Finland

[21] Appl. No.: 76,288

[22] Filed: Jul. 22, 1987

[30] Foreign Application Priority Data

Aug. 15, 1986 [FI] Finland ................... 863309

[51] Int. Cl.$^4$ .................. G01V 3/11; G01R 33/00
[52] U.S. Cl. .................... 324/329; 324/239; 324/336; 340/551
[58] Field of Search ............ 324/239, 329, 330, 336, 324/345; 340/551, 568, 572, 686

[56] References Cited

U.S. PATENT DOCUMENTS

| | | | |
|---|---|---|---|
| 2,735,980 | 2/1956 | Wait | 324/336 |
| 3,105,934 | 10/1963 | Barringer | 324/330 |
| 3,210,652 | 10/1965 | Seigel | 324/345 |
| 3,395,338 | 7/1968 | Barringer | 324/336 |
| 3,707,672 | 12/1972 | Miller et al. | 324/239 |
| 4,110,679 | 8/1978 | Payne | 324/329 |
| 4,114,086 | 9/1978 | Kaufman | 324/336 |
| 4,600,356 | 7/1986 | Bridges et al. | 324/329 X |

FOREIGN PATENT DOCUMENTS

| | | | |
|---|---|---|---|
| 1490191 | 10/1977 | United Kingdom | 324/329 |
| 2071327 | 9/1981 | United Kingdom | 324/329 |

Primary Examiner—Gerard R. Strecker
Attorney, Agent, or Firm—Brooks Haidt Haffner & Delahunty

[57] ABSTRACT

The invention relates to a method and an apparatus for detecting metal objects in a metal detecting apparatus using impulse techniques. The metal detector comprises a compensation circuit arranged in between the transmitter system (13) and the receiver system (14) in order to compensate the mutual inductance between the transmitter (11) and the receiver (12). The compensation circuit is advantageously operated so that the signal caused by the metal object in this detector is measurable during both at least two measuring sequences (21,22) located within the range of the cut-off peak of the transmitter current and during at least one measuring sequence (23) located outside the range of the cut-off peak of the transmitter current.

9 Claims, 2 Drawing Sheets

IMPULSE INDUCED EDDY CURRENT TYPE DETECTOR USING PLURAL MEASURING SEQUENCES IN DETECTING METAL OBJECTS

The present invention relates to a method and apparatus for detecting metal objects so that the mutual inductance between the transmitter and the receiver can be compensated to be essentially equal to null and that simultaneously the sensitivity to mechanical disturbance such as clatter of the apparatus can be reduced.

While realizing an impulse-operated metal detector, it is common practice to employ a so-called measuring window, which is the time interval during which a measurement is made, that is, a time period during which the measurement commences and ends. Thus the measuring window is employed for measuring the eddy currents created by the disconnection of the transmitter current. It is characteristic of many materials that measuring with a delay as short as possible renders the strongest signal. However, in many cases the mutual inductance between the transmitter and the receiver causes a sharp, relatively brief peak in the detected signal hereinafter referred to as cut-off peak, which is remarkably higher than the effective signal. Thus, owing to the high cut-off peak, the measuring delay cannot be made very short.

The mutual inductance between the transmitter and the receiver, which causes the cut-off peak, can be compensated for instance by employing the arrangement introduced in FIG. 1. In this arrangement, in between the transmitter 1 and the receiver 2, there is formed a compensation circuit 3, which comprises, in addition to the inductance coils 4, the resistors $R_1$ and $R_2$. In order to make it possible to eliminate the mutual inductance between the transmitter and the receiver of FIG. 1, the resistors $R_1$ and $R_2$ of the compensation circuit must be chosen so that the following condition becomes true:

$$M_{LV} - \frac{R_1}{R_1 + R_2} M_k = 0, \quad (1)$$

where $M_{LV}$ is a mutual inductance between the transmitter and the receiver, and $M_k$ is the mutual inductance of the compensation circuit. The reactances of the induction coils 4 are low with respect to the resistance of the resistor $R_1 + R_2$.

Although the mutual inductance between the transmitter and the receiver can be compensated to be null by means of the arrangement illustrated in FIG. 1, in a practical application it would be necessary to tune each metal detector on the spot owing to the fluctuations in the mutual inductance. In that case the resistors $R_1$ and $R_2$ of the compensation circuit could be defined only at the place of operation. A further problem with the arrangement according to FIG. 1 would be the fact that irreversible changes in the shape or position of the coils could prevent the operation of the apparatus and thus create a need for a new compensation.

The purpose of the present invention is to eliminate some of the drawbacks of the prior art and to achieve a new, improved and more secure impulse-operated method and apparatus for detecting metal objects so that by eliminating the disadvantages caused by the impulse technique and external interference, the signal/interference ratio of the apparatus can be improved, which also improves the identification of materials.

According to the invention, the tuning demand of the prior art is advantageously avoided so that the compensation of the mutual inductance between the transmitter and the receiver is carried out as an essentially continuous, automatic procedure by making use of microprocessor control. Thus it is also possible to place the measuring window, i.e. the desired measuring sequence, within the cut-off range of the transmitter current, i.e. within the time period during which the cut-off peak of the transmitter current is detected. Because the effective signals sent by various materials are beginning to form essentially immediately during the change in the transmitter current, it is possible to carry out measurements in the continuous-operation mutual inductance compensation even when the effective signals from various materials are at their highest. The alarm limits adjusted in the signal detection and processing members of the metal detector can, within the range of the effective signals, be defined according to a desired recognizable component. However, because any possible mechanical disturbance, such as clatter and vibration, may affect the signals under measurement within the cut-off range of the transmitter current, it is advantageous to place the measuring window so that it remains outside the effective area of the cut-off range of the transmitter current, i.e. outside the effective area of the cut-off peak. The alarm limit for this measuring window placed outside the cut-off peak must, however, be chosen so that it is lower than within the range of the cut-off peak, because the signal level of the effective signals essentially declines with a long measuring delay. The size and location of the measuring windows, i.e. the measuring sequences, can well be chosen advantageously independent of each other, both with a short and a long measuring delay.

The apparatus of the invention is advantageously operated for detecting metal objects so that if the alarm limit, serving as an identification parameter in the measuring window located outside the cut-off range of the transmitter current, is surpassed, it is necessary that the alarm limit is likewise surpassed in the measuring window within the cut-off range of the transmitter current before the apparatus gives an alarm signal proper. The surpassing rate of the alarm limit required for an alarm signal during the measuring sequences located within the range of the cut-off peak can be advantageously defined either so that any surpassing of the alarm limit is sufficient for alarm, or so that within the range of the cut-off peak, the alarm limit must be surpassed to a degree which is comparable to the degree of surpassing taking place outside the range of the cut-off peak. Thus, according to the invention, any false alarms caused by external interference can be essentially avoided. As regards such interference, the employed alarm limits which are different within and without the cut-off range of the transmitter current, make sure that even if the alarm limit outside the cut-off range should be surpassed, it is necessary that the alarm limit is also surpassed within the cut-off range, for instance to the same degree irrespective of an essentially higher alarm level.

By employing the method of the invention, the material causing the alarm signal can also be indentified for classification. Bacause for instance the effective signals caused by magnetic and non-magnetic materials are essentially deviant in shape within the range of the cut-off peak, the nature of the material which has caused the signal can be deduced from the relationship of the signals if at least two measuring sequences are used within the range of the cut-off peak.

Figure 2:
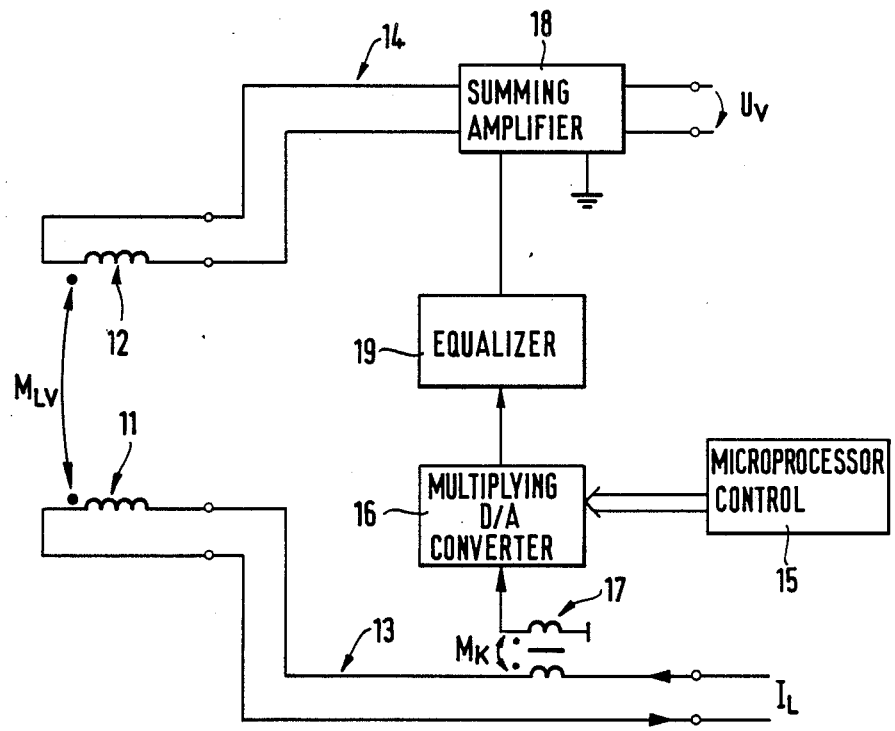
Figure 3:
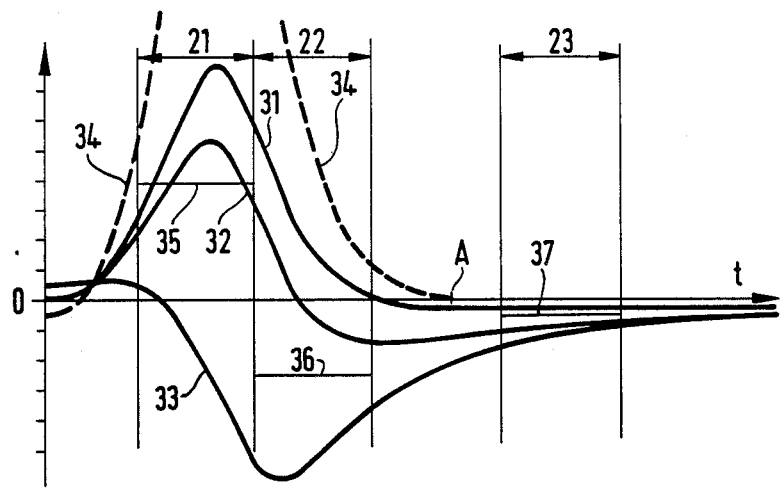
Figure 4:
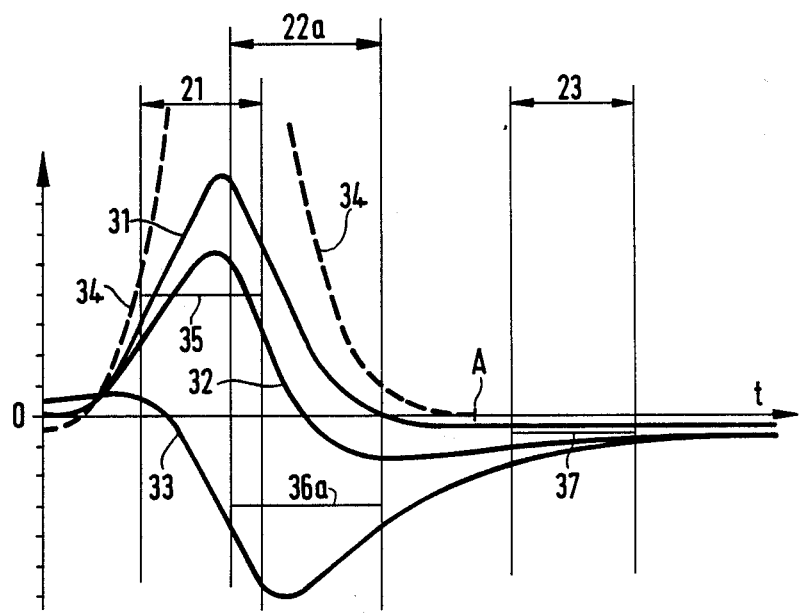

In the following the invention is explained in more detail with reference to the appended drawings, where FIG. 1 is an illustration of a prior art arrangement designed for compensating the mutual inductance between the transmitter and the receiver, FIG. 2 is an illustration of a preferred embodiment of the arrangement according to the present invention for compensating the mutual inductance between the transmitter and the receiver, FIG. 3 is an illustration of an advantageous location of the measuring windows on the time-axis according to the invention, as well as of the respective alarm limits advantageous for various measuring windows during the change of the transmitter current in the height/time coordinates of the signal, and FIG. 4 is an illustration of another location of the measuring windows on the time-axis according to the invention, as well as of the respective alarm limits advantageous for various measuring windows during the change of the transmitter current in the height/time coordinates of the signal.

FIG. 1 has already been explained in connection to the description of the prior art.

In the arrangement of FIG. 2, according to the invention, between the transmitter system 13 and the receiver system 14 there is placed the multiplying digital to analog converter 16 controlled by aid of the microprocessor 15 in order to continuously and automatically compensate the mutual inductance $M_{LV}$ between the transmitter 11 and the receiver 12. The converter 16 is electrically connected to the transmitter and receiver systems 13, 14 by intermediation of the transformer 17 and the summing amplifier 18. In order to carry out the compensation in an advantageous fashion, the equalizer 19 is used for correcting the frequency responses of the signals connected to the summing amplifier 18 via the mutual inductances $M_{LV}$ and $M_k$ so that the said frequency responses are essentially equal.

The digital to analog converter 16 for compensating for the mutual inductance between the transmitter 13 and receiver 14, works like an automatically adjusted resistor. Because the D/A converter 16 is like an adjusted resistor, it coacts with the amplifier 18 and the equalizer 19 so that the influence between the transmitter and the receiver are compensated, and so that the influence of the cut-off peak is decreased. This makes it possible to measure the signal during a measuring window within the cut-off range.

The basic idea of the present invention is that the signal caused by a metal object can be measured in the range of the cut-off peak. The amplitude of the cut-off peak is much greater than the signals from metal objects, and therefore the cut-off peak covers the signals, unless compensation is effected. In order to control this compensation, a sample is taken from the current which is conducted to the transmitter system 13. The sample of the current is then conducted to a D/A converter 16, where the sample of the current is multiplied by an amplifying coefficient. This coefficient depends on the mutual inductance between the transmitter 11 and the receiver 12, according to the ratio described in formula (1) above.

The microprocessor 15 controls the voltage $U_v$ from the summing amplifier 18 and changes the value of the amplifying coefficient in the converter 16 when needed so that the voltage $U_v$ during a prolonged period is essentially zero. When the voltage $U_v$ which is a sum of the voltages caused by the currents which are conducted through the converter 16 and the transmitter/receiver systems is essentially zero, the compensation is managed and the cut-off peak is eliminated.

The equalizer 19 is used for correcting the frequency responses of the signals, e.g. for equalizing the phase difference before summing the currents from the receiver system and the D/A converter 16. This kind of phase difference is caused by the other components used in the apparatus, and it can be determined in advance in order to select the correct equalizer 19 for the apparatus.

For measurement of the voltage $U_v$ after the summing component 18 there is a sample and hold circuit from which information is conducted to the microprocessor 15 for effective compensation.

Compensation is continuously carried out so that the voltage is maintained at a value of essentially zero. The influence of the cut-off peak appears in the receiver system and at the range of this peak the signals from objects being detected are greater than outside the range of the cut-off peak. When the compensation is carried out, the signal/interference ratio becomes better, and by using e.g. two sequences at the range of the cut-off peak the influence from objects made of different materials is eliminated. In FIGS. 3 and 4 the curve 33 illustrates a signal from a magnetic material, while curves 31 and 32 illustrate signals from non-magnetic materials.

In FIG. 3, the schematical effective signals 31, 32 and 33 for various metal-containing materials are illustrated in the signal height/time coordinates so that the time $t=0$ corresponds to the starting moment of the cut-off of the transmitter current. During the cut-off of the transmitter current, the cut-off peak owing to the cut-off begins to form; the said peak is represented as the dotted line 34. Because the cut-off peak 34 is remarkably higher than the effective signal peaks, the ultimate peak of the cut-off peak 34 is left out of FIG. 3 for the sake of clarity. According to the invention, within the range of the cut-off peak 34, i.e. the cut-off range of the transmitter current, which on the time-axis of FIG. 3 means the interval from the spot $t=0$ to the spot A, there are located the measuring sequences 21 and 22. Moreover, essentially outside the range of the cut-off peak 34, there is located the measuring sequence 23. While employing the method of the invention in an advantageous fashion, the alarm limit set for the measuring window or measuring sequence 23, operated with a long measuring delay after the cut-off of the transmitter current and located outside the cut-off range, is essentially lower than the alarm limit set for the measuring sequences 21 and 22 operated with a short measuring delay and located within the cut-off range of the transmitter current, as is illustrated by the horizontal lines 35, 36 and 37 in FIG. 3.

While measuring, according to the invention, the signals caused by an object under examination by employing an apparatus which makes use of impulse technique, it is advantageous to utilize at least two measuring sequences, 21 and 22, located inside the cut-off range, and one measuring sequence 23 located outside the cut-off range. The obtained measuring results are advantageously registered for instance in a microprocessor 15, which carries out the comparison with the predetermined alarm limits 35, 36 and 37. If the essentially low-level alarm limit, as regards its absolute value, set during the measuring sequence 23 with the long measuring delay is surpassed, the measuring results from the sequences 21 and 22 with the short measuring delay are compared to the essentially high-level alarm limits as regards their absolute value. If the alarm limit is surpassed both during the measuring sequence 23 with the long measuring delay and during at least one of the sequences 21 and 22 with the short measuring delay, the apparatus gives an alarm signal. Furthermore, by aid of the measuring sequences 21 and 22 located within the cut-off range of the transmitter current, it is also possible to obtain information of the material to be detected, when the received measuring results are compared to the characteristics of the effective signals caused by different materials.

FIG. 4 illustrates another application of the location of the measuring sequences of the effective signals caused by various materials within the range of the cut-off peak 34 of FIG. 3. In the application of FIG. 4, one of the measuring sequences located within the range of the cut-off peak 34, i.e. the sequence 22a, is enlarged so that it partially overlaps the sequence 21. At the same time, this change in the measuring sequence may bring about a necessity to change the alarm limit, and the new alarm limit is in FIG. 4 marked by the number 36a.

We claim:

1. A method for improving the signal/interference ratio and material identification in the detection of metal objects by detecting and measuring eddy currents induced in such objects, comprising: using an impulse-type metal detector of the type providing a signal representing detected current having a transmitter and a receiver, causing a cut-off peak signal of brief duration to result from mutual inductance between the transmitter and the receiver by cutting off a flow of current to the transmitter, detecting said cut-off peak signal with the receiver, automatically compensating for mutual inductance between the transmitter and the receiver by using a compensation circuit, conducting measurements of signals caused by the presence of a metal body in at least two measuring sequences within the brief duration of said cut-off peak and in at least one measuring sequence after the cut-off peak and including comparing a signal measured during said cut-off peak with a predetermined alarm limit, comparing a signal measured after said cut-off peak with a predetermined alarm limit, and activating an alarm only when both said alarm limits are surpassed.

2. The method of claim 1, including using a microprocessor to compensate for mutual inductance.

3. The method of claim 1 or 2, including compensating esentially continuously for mutual inductance.

4. The method of claim 1 wherein the alarm limit for said cut-off peak is greater than the alarm limit after the cut-off peak.

5. The method of claim 1, including activating the alarm only when the measured signal during the cut-off peak surpasses the alarm limit to the same extent that the measured signal after the cut-off peak surpasses its respective alarm limit.

6. A metal detector for detecting metal objects, including a transmitter and a receiver, means for automatically compensating for mutual inductance between the transmitter and the receiver, said receiver comprising means for detecting and measuring signals caused by the induction of eddy currents in a metal object during at least two measuring sequences during a cut-off peak of a measured signal detected by said receiver and caused by cutting off current to the transmitter, and means for measuring signals caused by the presence of a metal body after said cut-off peak, and including means for comparing a signal measured during said cut-off peak with a predetermined alarm limit and means for comparing a signal measured after said cut-off peak with a predetermined alarm limit, and alarm means operative only when both said measured signals exceed their alarm limits.

7. A metal detector according to claim 6 wherein said means for compensating for mutual inductance is controlled by a microprocessor.

8. A metal detector according to claim 6 wherein said means for compensating for mutual inductance comprises, a compensation circuit, including a digital to analog converter and an equalizer between the transmitter and the receiver.

9. The metal detector of claim 8 wherein a microprocessor is connected to said digital to analog converter for controlling said compensation circuit.

* * * * *